United States Patent
Fan

(10) Patent No.: US 9,317,071 B2
(45) Date of Patent: Apr. 19, 2016

(54) ELECTRONIC DEVICE AND HINGE MODULE THEREOF

(71) Applicant: Wistron Corporation, New Taipei (TW)

(72) Inventor: Chin-Lung Fan, New Taipei (TW)

(73) Assignee: Wistron Corporation, New Taipei (TW)

( * ) Notice: Subject to any disclaimer, the term of this patent is extended or adjusted under 35 U.S.C. 154(b) by 451 days.

(21) Appl. No.: 13/860,535

(22) Filed: Apr. 11, 2013

(65) Prior Publication Data

US 2014/0211416 A1     Jul. 31, 2014

(30) Foreign Application Priority Data

Jan. 31, 2013   (TW) .............................. 102103809 A

(51) Int. Cl.
  *G06F 1/16*     (2006.01)
  *E05D 11/10*    (2006.01)

(52) U.S. Cl.
  CPC ......... *G06F 1/1681* (2013.01); *E05Y 2900/606* (2013.01); *Y10T 16/5409* (2015.01)

(58) Field of Classification Search
  CPC ................... Y10T 16/54026; Y10T 16/54028; Y10T 16/54029; Y10T 16/5404; Y10T 16/54044; Y10T 16/5402; Y10T 16/54023; Y10T 16/54024; Y10T 16/540247; Y10T 16/54025; Y10T 16/5406; Y10T 16/544; G06F 1/1681; E05D 11/06; E05D 11/08; E05D 11/10; E05D 11/1007; E05D 11/1014; E05D 11/1028; E05D 11/105; E05D 2011/088; E05D 2011/1035
  USPC ....................................... 361/679.55; 16/352
  See application file for complete search history.

(56) References Cited

U.S. PATENT DOCUMENTS

| | | | | |
|---|---|---|---|---|
| 4,305,160 | A | * | 12/1981 | Sundahl ............................. 2/424 |
| 4,502,182 | A | * | 3/1985 | Lautenschlager et al. ...... 16/288 |
| 6,993,808 | B1 | * | 2/2006 | Bennett et al. ................... 16/334 |
| 2007/0011848 | A1 | * | 1/2007 | Lu et al. .......................... 16/340 |
| 2008/0047104 | A1 | * | 2/2008 | Chien et al. ..................... 16/334 |
| 2008/0316693 | A1 | * | 12/2008 | Li et al. ......................... 361/683 |
| 2010/0230549 | A1 | | 9/2010 | Probasco et al. |
| 2010/0251518 | A1 | * | 10/2010 | Chiang ............................ 16/277 |
| 2010/0293748 | A1 | * | 11/2010 | Yamashita ....................... 16/249 |

OTHER PUBLICATIONS

"Office Action of Taiwan Counterpart Application with partial English translation", issued on Sep. 17, 2015, p. 1-p. 6.

* cited by examiner

*Primary Examiner* — Hoa C Nguyen
*Assistant Examiner* — Christopher L Augustin
(74) *Attorney, Agent, or Firm* — Jianq Chyun IP Office

(57) ABSTRACT

An electronic device includes a first body, a second body and a hinge module. The hinge module includes a first pivot component, a second pivot component and a sliding component. The first pivot component fixed on the first body has a positioning portion. The second pivot component is fixed on the second body. The first pivot component is pivoted to the second pivot component. The sliding component slidably disposed at the second pivot component has a positioning structure. When the positioning structure is on a moving path of the positioning portion and the first pivot component rotates and drives the positioning portion to arrive at the positioning structure, the positioning structure interferes with the positioning portion to position the first pivot component. When the first pivot component rotates reversely, the positioning portion pushes the sliding component and the positioning structure moves away from the moving path.

20 Claims, 8 Drawing Sheets

ELECTRONIC DEVICE AND HINGE MODULE THEREOF

CROSS-REFERENCE TO RELATED APPLICATION

This application claims the priority benefit of Taiwan application serial no. 102103809, filed on Jan. 31, 2013. The entirety of the above-mentioned patent application is hereby incorporated by reference herein and made a part of this specification.

BACKGROUND OF THE INVENTION

1. Field of the Invention

The invention relates to an electronic device and a hinge module thereof, and in particular to an electronic device and its hinge module having a positioning structure.

2. Description of Related Art

With advanced semiconductor elements and technology of displays, electronic devices are constantly developed to be small, multi-functional, and easy to carry. Common portable electronic devices include tablet PCs, smart phones, notebook computers, and so forth.

Take the notebook computers as an example. Most conventional notebook computers are composed of a host and a display screen, wherein the host and the display screen are pivoted to each other. A user may close the display to the host of the notebook computer by relative rotation of the host and the display for easy portability. When needing to use the notebook computer, the user opens the display screen from the host for easy manipulation. More and more notebook computers are equipped with a touch display screen. When the user touches the display screen for manipulation, the pressing force on the screen usually causes the display screen to shake, which causes the user visual discomfort and operational difficulty.

SUMMARY OF THE INVENTION

The invention provides an electronic device of which a body shakes less severely when it is being pressed.

The electronic device of the invention includes a first body, a second body, and a hinge module. The hinge module includes a first pivot component, a second pivot component, and a sliding component. The first pivot component fixed on the first body has a positioning portion. The second pivot component is fixed on the second body. The first pivot component is pivoted to the second pivot component and is adaptable to rotate relative to the second pivot component to drive the positioning portion to move along a moving path. The sliding component slidably disposed at the second pivot component has a positioning structure. When the sliding component is at a first position, the positioning structure is on the moving path. When the first pivot component rotates relative to the second pivot component in a first pivot direction and drives the positioning portion to arrive at the positioning structure along the moving path, a structural interference is formed between the positioning portion and the positioning structure to position the first pivot component and the first body. When the first pivot component rotates relative to the second pivot component in a second pivot direction opposite to the first pivot direction, the sliding component is pushed by the positioning portion and then slides relative to the second pivot component from the first position to a second position, such that the positioning structure is driven to move away from the moving path.

The hinge module of the invention is adaptable for an electronic device. The electronic device includes a first body and a second body. The hinge module includes a first pivot component, a second pivot component, and a sliding component. The first pivot component fixed on the first body has a positioning portion. The second pivot component is fixed on the second body. The first pivot component is pivoted to the second pivot component and is adaptable to rotate relative to the second pivot component to drive the positioning portion to move along a moving path. The sliding component slidably disposed at the second pivot component has a positioning structure. When the sliding component is at a first position, the positioning structure is on the moving path. When the first pivot component rotates relative to the second pivot component in a first pivot direction and drives the positioning portion to arrive at the positioning structure along the moving path, a structural interference is formed between the positioning portion and the positioning structure to position the first pivot component and the first body. When the first pivot component rotates relative to the second pivot component in a second pivot direction opposite to the first pivot direction, the sliding component is pushed by the positioning portion and then slides relative to the second pivot component from the first position to a second position, such that the positioning structure is driven to move away from the moving path.

In an embodiment of the invention, when the first pivot component rotates relative to the second pivot component in the first pivot direction, an included angle between the first body and the second body gradually increases. When the first pivot component rotates relative to the second pivot component in the second pivot direction, the included angle between the first body and the second body gradually decreases.

In an embodiment of the invention, the moving path includes a first segment and a second segment. A positioning structure is aligned to the first segment. When the included angle between the first body and the second body is smaller than an angle, the positioning portion is at the second segment. When the included angle between the first body and the second body is larger than the angle, the positioning portion is at the first segment.

In an embodiment of the invention, the second pivot component has a first sliding slot. The positioning portion is slidably disposed in the first sliding slot, which constitutes a moving path.

In an embodiment of the invention, the positioning structure includes a plurality of recessed portions. When the sliding component is at the first position, the recessed portions are arranged in order along the moving path, and the positioning portion is adaptable to be positioned at any one of the recessed portions.

In an embodiment of the invention, the sliding component has at least a second sliding slot. The second pivot component has at least a first column which is slidably disposed in the second sliding slot.

In an embodiment of the invention, when the sliding component is at the first position, the first column leans against an end of the second sliding slot. When the first pivot component rotates relative to the second pivot component in the first pivot direction and drives the positioning portion to arrive at the positioning structure, the structural interference formed between the end of the second sliding slot and the first column stops the sliding component from sliding relative to the second pivot component.

In an embodiment of the invention, when the first pivot component rotates relative to the second pivot component in the second pivot direction, the sliding component is pushed by the positioning portion, and the first column moves towards another end of the second sliding slot from the end of the second sliding slot.

In an embodiment of the invention, the second pivot component has an elastic portion. The sliding component leans against the elastic portion and is positioned at the first position. When the first pivot component rotates relative to the second pivot component in the second pivot direction and pushes the sliding component via the positioning portion, the sliding component resists an elastic force of the elastic portion to move from the first position to the second position. When the positioning portion deviates from the sliding component, the sliding component returns from the second position to the first position via the elastic force of the elastic portion.

In an embodiment of the invention, the elastic portion includes two elastic arms. A free end of each of the elastic arms has a guiding arc surface. The sliding component has a second column. The second column leans against the two guiding arc surfaces so that the sliding component is positioned at the first position. When the sliding component moves to the second position, the second column resists the elastic force of the two elastic arms and moves towards a gap between the two elastic arms along the two guiding arc surfaces.

Based on the aforementioned, the sliding component in the hinge module of the invention has the positioning structure, and the first pivot component has the positioning portion. When the user opens the first body from the second body, the first pivot component fixed on the first body rotates relative to the second pivot component fixed on the second body and drives the positioning portion to arrive at the positioning structure. In the meantime, the structural interference formed between the positioning portion and the positioning structure positions the first pivot component and the first body. Thus, when the user presses the first body to perform touch input, the first body shakes less severely so that the user can smoothly and comfortably manipulate the electronic device. In addition, when the user closes the first body, which is opened from the second body, to the second body, the first pivot component rotates reversely relative to the second pivot component. In the meantime, the positioning portion pushes the sliding component to slide relative to the second pivot component so that the positioning structure on the sliding component moves away from the moving path of the positioning portion. Thus, during the process in which the user closes the first body to the second body, the structural interference is not formed between the positioning portion and the positioning structure so that the user can smoothly and easily close the first body to the second body.

In order to make the aforementioned features and advantages of the invention more comprehensible, embodiments accompanying figures are described in detail below.

DESCRIPTION OF EMBODIMENTS

Figure 1:
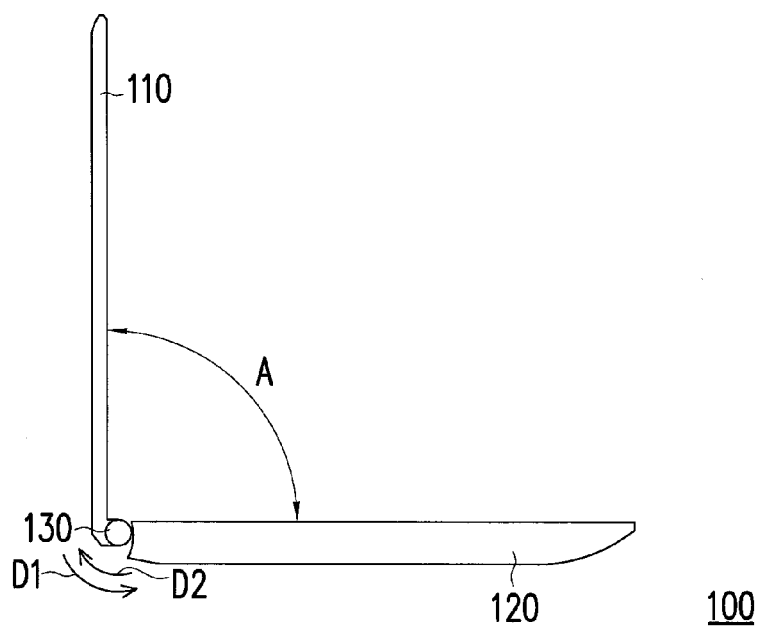
FIG. 1 is a schematic view of an electronic device in an embodiment of the invention.
Figure 2:
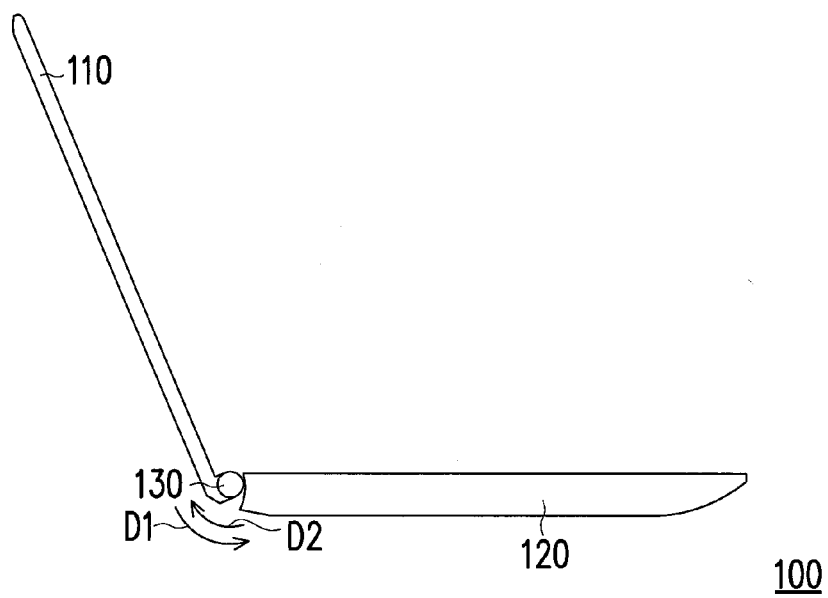
FIG. 2 is schematic diagram illustrating that a first body in FIG. 1 is opened from a second body in a first pivot direction.
Figure 3:
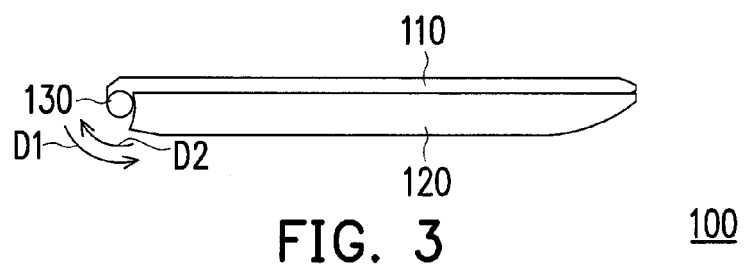
FIG. 3 is schematic diagram illustrating that the first body in FIG. 1 is closed to the second body in a second pivot direction.

FIG. 1 is a schematic view of an electronic device in an embodiment of the invention. FIG. 2 is schematic diagram illustrating that a first body in FIG. 1 is opened from a second body in a first pivot direction. FIG. 3 is schematic diagram illustrating that the first body in FIG. 1 is closed to the second body in a second pivot direction. Referring to FIGS. 1-3, an electronic device 100 in the embodiment is, for example, a notebook computer and includes a first body 110, a second body 120, and a hinge module 130. The first body 110 is, for example, a display screen of the notebook computer. The second body 120 is, for example, a host of the notebook computer. The first body 110 is pivoted to the second body 120 via the hinge module 130. The first body 110 is capable of rotating relative to the second body 120 in a first pivot direction D1 so that an included angle between the first body 110 and the second body 120 can gradually increase, allowing the first body 110 to open to be in a state as shown in FIG. 2 and to be tilted in an angle suitable for a user's manipulation and viewing. In addition, the first body 110 is capable of rotating relative to the second body 120 in a second pivot direction D2 so that the included angle between the first body 110 and the second body 120 can gradually decrease, allowing the first body 110 to close to be in a state as shown in FIG. 3 so the electronic device 100 is easy to be stored or carry.

Figure 4:
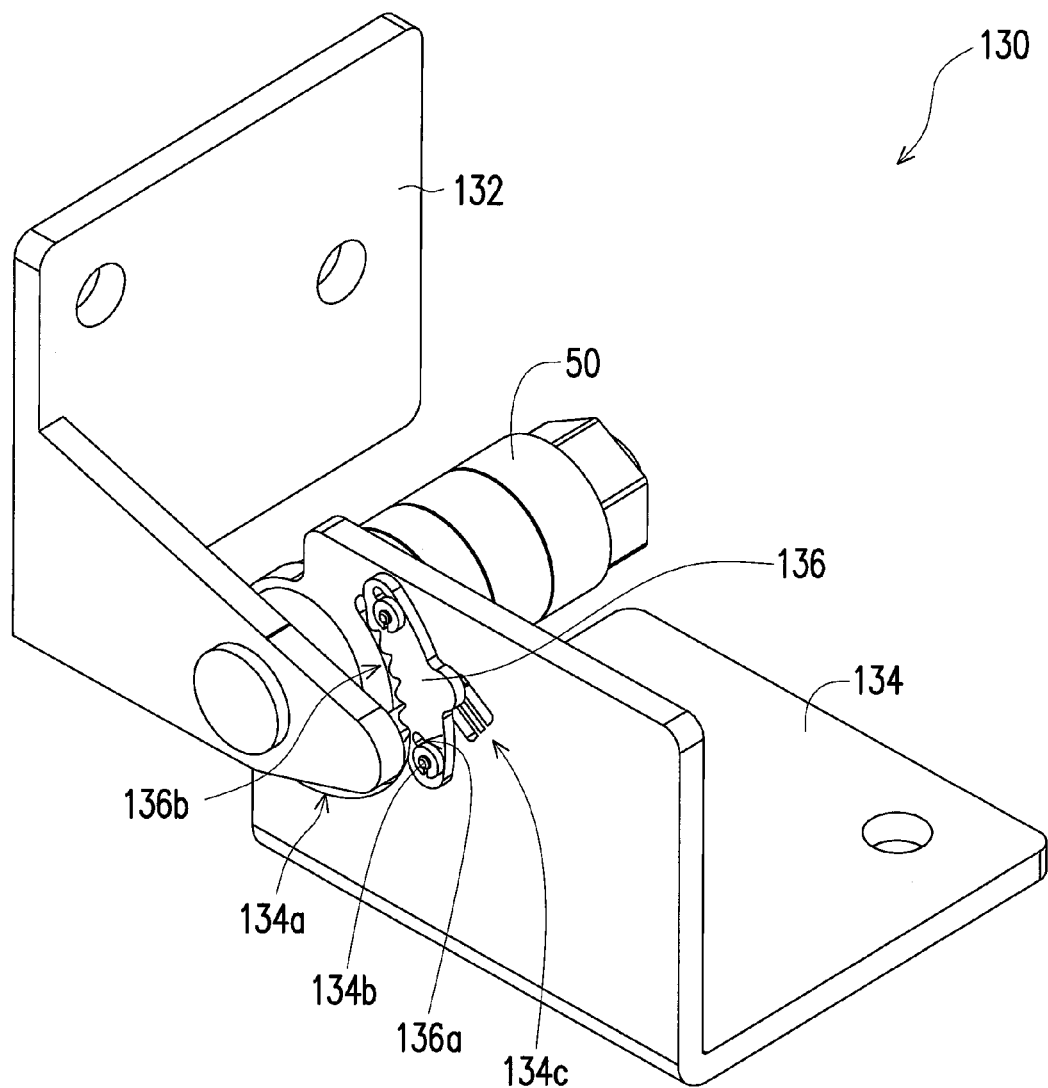
FIG. 4 is a three-dimensional view of a hinge module in FIG. 1.
Figure 5:
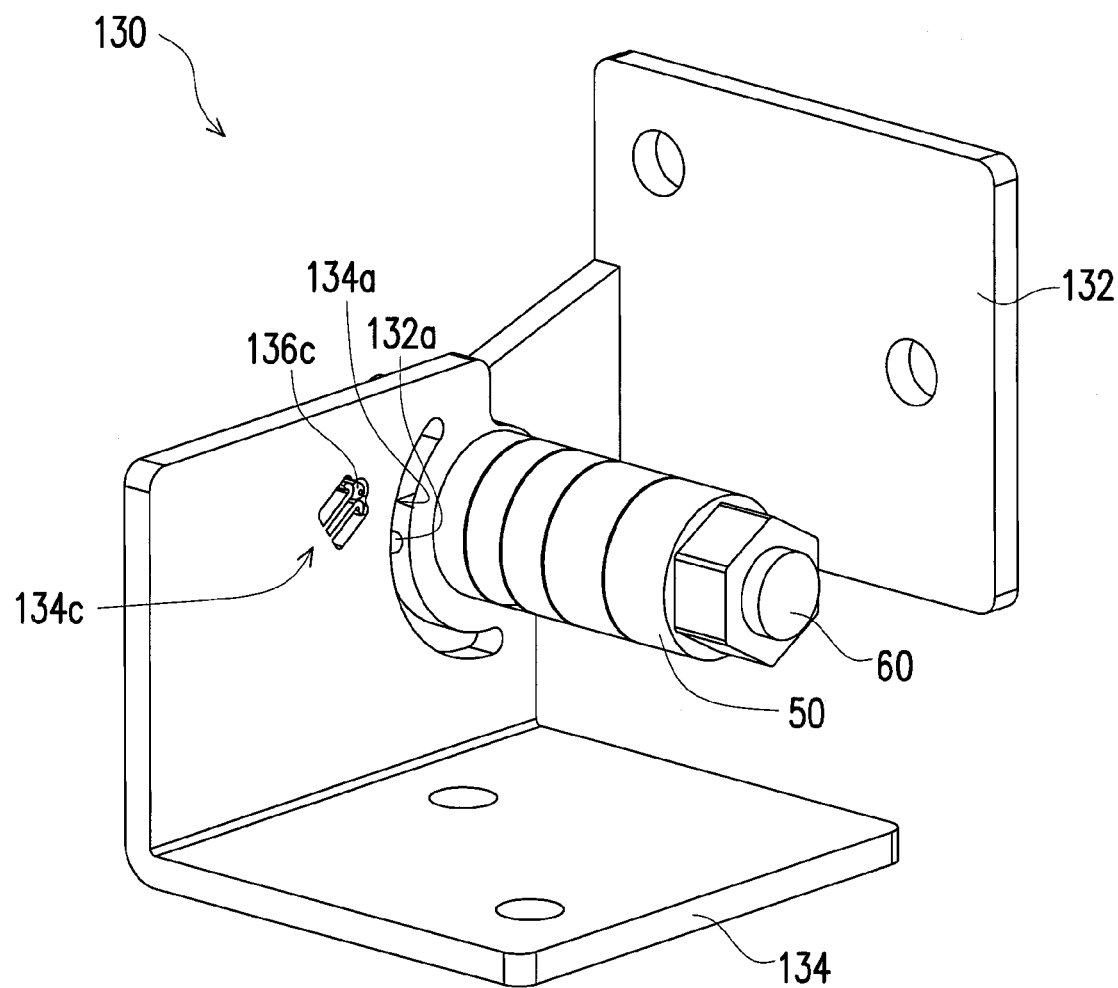
FIG. 5 is a three-dimensional view of the hinge module in FIG. 4 viewed from another viewing angle.
Figure 6:
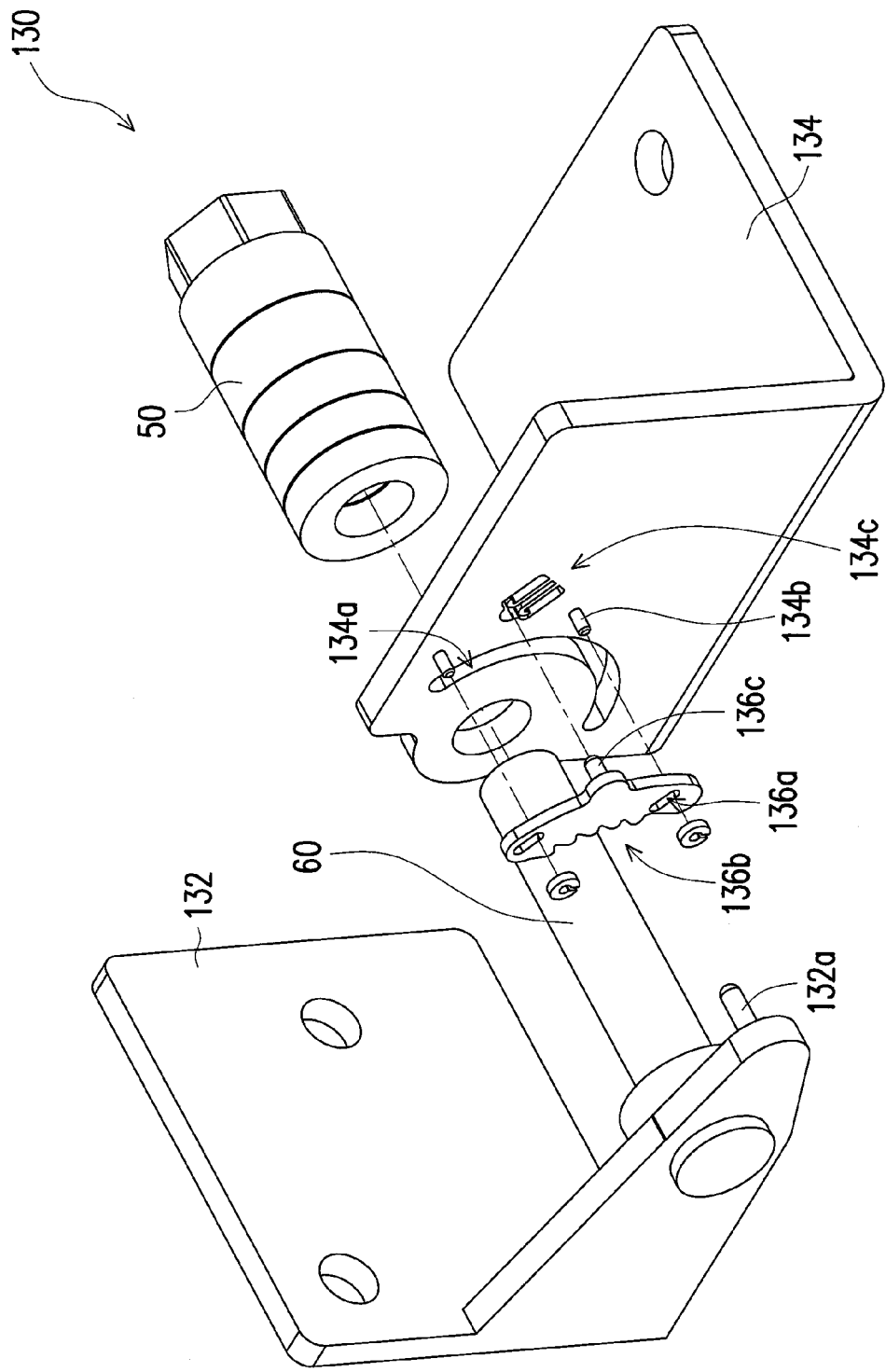
FIG. 6 is an explosive view illustrating the hinge module in FIG. 4.

FIG. 4 is a three-dimensional view of a hinge module in FIG. 1. FIG. 5 is a three-dimensional view of the hinge module in FIG. 4 viewed from another viewing angle. FIG. 6 is an explosive view illustrating the hinge module in FIG. 4. Referring to FIGS. 4-6, the hinge module 130 in the embodiment includes a first pivot component 132 and a second pivot component 134. The first pivot component 132 is fixed on the first body 110 as shown in FIG. 1. The second pivot component 134 is fixed on the second body 120 as shown in FIG. 1. Meanwhile, the first pivot component 132 is pivoted to the second pivot component 134. A torsion axis 60 of the first pivot component 132 is connected to a reed set 50. With a friction force formed between the reed set 50 and the torsion axis 60, the first pivot component 132 and the second pivot component 134 can have a suitable torsion therebetween.

In the embodiment, the first pivot component 132 has a positioning portion 132a, and the second pivot component 134 has a first sliding slot 134a. The positioning portion 132a of the first pivot component 132 is slidably disposed in the first sliding slot 134a of the second pivot component 134. The first sliding slot 134a constitutes a moving path for the positioning portion 132a to move along. The first pivot component 132 is adaptable to rotate relative to the second pivot component 134 to drive the positioning portion 132a to move along the moving path. The hinge module 130 further includes a sliding component 136. The sliding component 136 has at least a second sliding slot 136a (two are illustrated) and a positioning structure 136b. The second pivot component 134 has at least a first column 134b (two are illustrated). The first column 134b of the second pivot component 134 is slidably disposed in the second sliding slot 136a of the sliding component 136 so that the sliding component 136 can be slidably disposed at the second pivot component 134. In other embodiments, the sliding component 136 may be slidably disposed at the second pivot component 134 via other suitable structures, which should not be construed as a limitation to the invention. The actuation manner of the first pivot component 132, the second pivot component 134, and the sliding component 136 in the embodiment is described in detail below with drawings.

Figure 7:
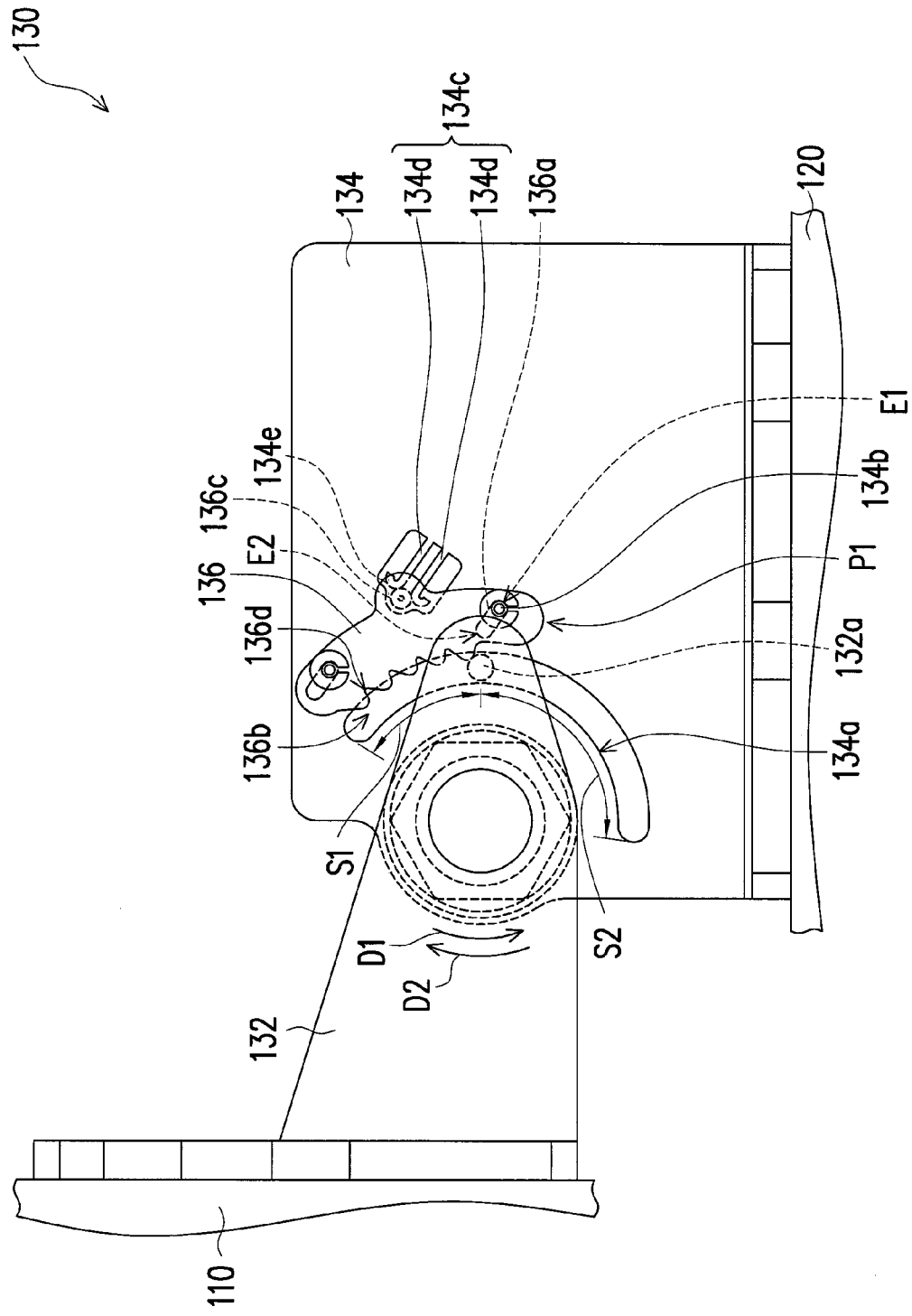
FIG. 7 is a side view of a hinge module in FIG. 1.
Figure 8:
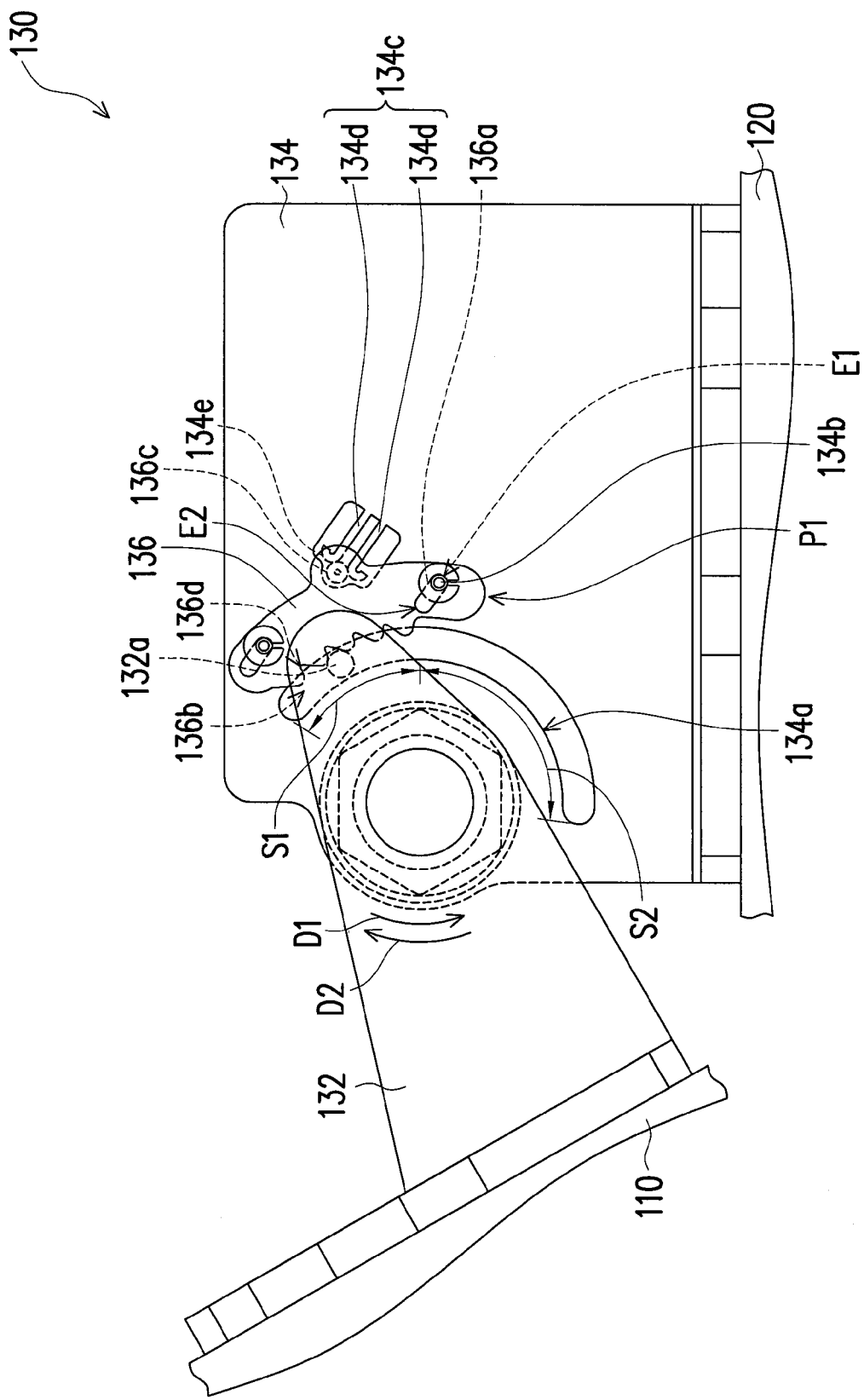
FIG. 8 is a side view of a hinge module in FIG. 2.
Figure 9:
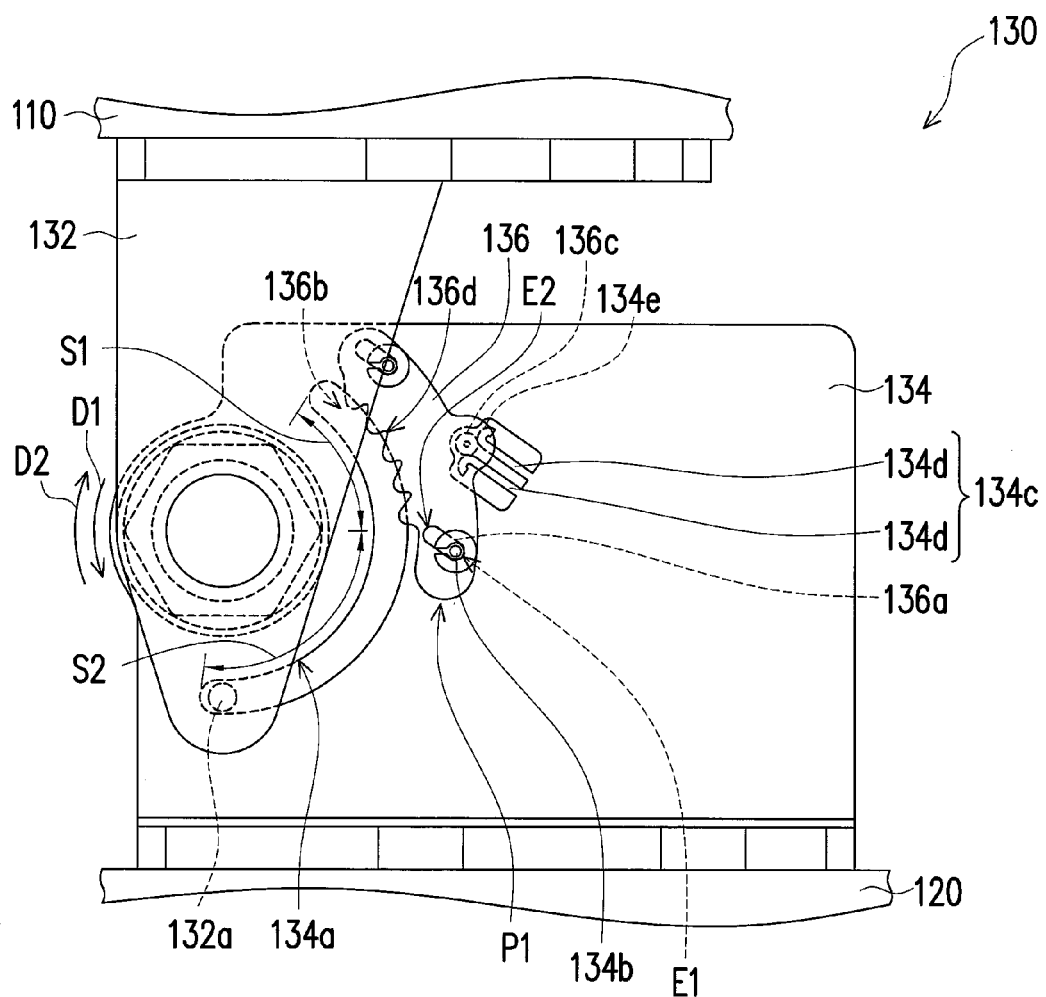
FIG. 9 is a side view of a hinge module in FIG. 3.

FIG. 7 is a side view of a hinge module in FIG. 1. FIG. 8 is a side view of a hinge module in FIG. 2. FIG. 9 is a side view of a hinge module in FIG. 3. Referring to FIGS. 7-9, the positioning structure 136b includes a plurality of recessed portions 136d. When the sliding component 136 is at a first position P1 as shown in FIGS. 7-9, the recessed portions 136d are arranged in order along the moving path formed by the first sliding slot 134a, and the positioning portion 132a of the first pivot component 132 is adaptable to be positioned at any one of the recessed portions 136d so as to position the first pivot component 132 and the first body 110. For example, when the user opens the first body 110 shown in FIG. 3 to be in a state shown in FIG. 2, the first pivot component 132 rotates relative to the second pivot component 134 in a first pivot direction D1, and drives the positioning portion 132a to move from a position shown in FIG. 9 to a position shown in FIG. 8 along the moving path to arrive at the positioning structure 136b and to be positioned at any one of the recessed portions 136d. In the meantime, a structural interference is formed between the positioning portion 132a and the positioning structure 136b to position the first body 110 to be in a state shown in FIG. 2. Thus, when the user presses the first body 110 (e.g. a display screen of a notebook computer) to perform touch input, the first body 110 will shake less severely so the user can smoothly and comfortably manipulate the electronic device 100.

When the positioning portion 132a is positioned at a different recessed portion 136d, the first body 110 is positioned at a different position and has a different tilting angle. For example, the recessed portions 136d in the embodiment are adaptable to respectively fix the included angle between the first body 110 and the second body 120 to be 100 degrees, 110 degrees, 120 degrees, and 130 degrees. In other embodiments, the recessed portions 136d may be designed to be suitable for fixing the included angle between the first body 110 and the second body 120 to be other suitable angles, which should not be construed as a limitation to the invention.

Generally speaking, usually the user performs touch manipulation to the first body 110 only when the included angle between the first body 110 and the second body 120 is larger than a specific angle (e.g. 90 degrees); therefore, the positioning portion 132a and the positioning structure 136b may be designed to form the structural interference therebetween only on a specific moving route to position the first body 110. Specifically, the moving path formed by the first sliding slot 134a includes a first segment S1 and a second segment S2, and the positioning structure 136b of the sliding component 136 is aligned to the first segment S1. When the included angle between the first body 110 and the second body 120 is smaller than an angle A shown in FIG. 1, the positioning portion 132a is at the second segment S2. When the included angle between the first body 110 and the second body 120 is larger than the angle A shown in FIG. 1, the positioning portion 132a is at the first segment S1. In other words, during the process where the first body 110 is opened to be in a state shown in FIG. 1 from a state shown in FIG. 3, the positioning portion 132a is in the second segment S2 of the moving path and does not form the structural interference with the positioning structure 136b, allowing the user to easily and smoothly open the first body 110 shown in FIG. 3 to be in a state shown in FIG. 1. When the user further opens the first body 110, the positioning portion 132a will enter the first segment S1 of the moving path and form the structural interference with the positioning structure 136b so as to position the first body 110. The angle A shown in FIG. 1 is, for example, 90 degrees; however, the invention is not limited thereto. In other embodiments, the angle A may be other suitable angles.

Figure 10:
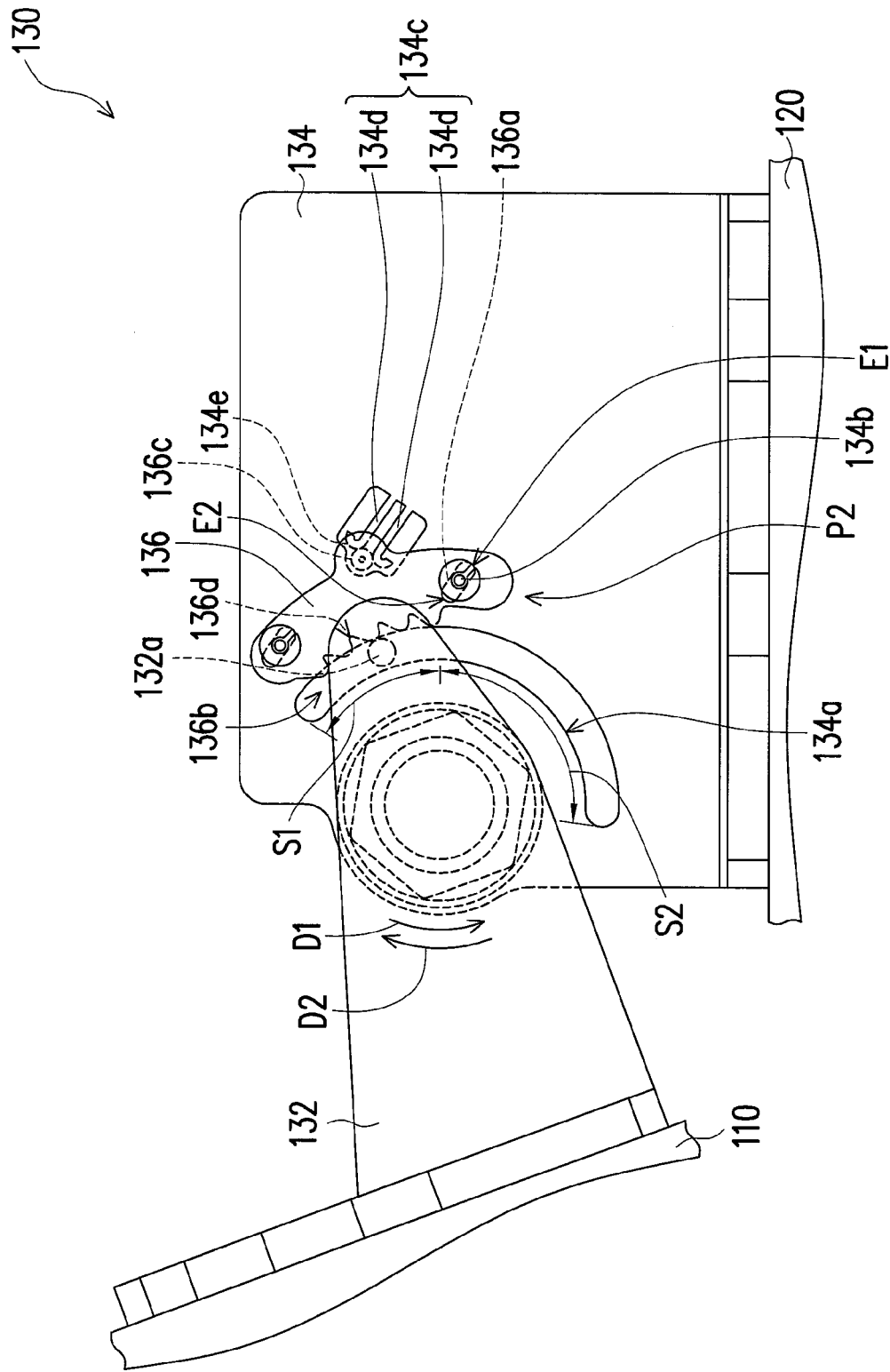
FIG. 10 is schematic diagram illustrating that a positioning portion in FIG. 8 pushes a sliding component.

In the embodiment, with the actuation of the sliding component 136, the user is able to easily close the first body 110 to the second body 120. Specifically, when the user closes the first body 110 to the second body 120, the first pivot component 132 rotates relative to the second pivot component 134 in a second pivot direction D2 opposite to the first pivot direction D1. Meanwhile, the positioning portion 132a pushes the sliding component 136 so that the positioning structure 136b moves away from the moving path formed by the first sliding slot 134a. FIG. 10 is a schematic view illustrating that a positioning portion in FIG. 8 pushes a sliding component. For example, when the first pivot component 132 rotates in the second pivot direction D2 to be in a state shown in FIG. 10 from a state shown in FIG. 8, the sliding component 136 will be pushed by the positioning portion 132a to slide from the first position P1 shown in FIG. 8 to a second position P2 shown in FIG. 10 and drives the positioning structure 136b to move away from the moving path. Thus, during the process in which the user closes the first body 110 to the second body 120 to drive the positioning portion 132a to move from the first segment S1 of the moving path to the position shown in FIG. 9, the structural interference will not be formed between the positioning portion 132a and the positioning structure 136b, so that the user can smoothly and easily close the first body 110 to the second body 120.

The actuation manner of the sliding component 136 in the embodiment will be described in detail below. When the sliding component 136 is at the first position P1 as shown in FIGS. 7-8, the first column 134b of the second pivot component 134 leans against an end E1 of the second sliding slot 136a of the sliding component 136. When the first pivot component 132 rotates relative to the second pivot component 134 in the first pivot direction D1 and drives the positioning portion 132a to arrive at the positioning structure 136b of the sliding component 136, a structural interference formed between the end E1 of the second sliding slot 136a and the first column 134b will stop the sliding component 136 from sliding relative to the second pivot component 134, so that the structural interference can actually be formed between the positioning portion 132a and the positioning structure 136b of the sliding component 136 to position the first body 110. When the first pivot component 132 rotates relative to the second pivot component 134 in the second pivot direction D2, the sliding component 136 is pushed to the second position P2 by the positioning portion 132a (as shown in FIG. 10). The first column 134b moves towards another end E2 of the second sliding slot 136a from the end E1 of the second sliding slot 136a. Moreover, the positioning structure 136b moves away from the moving path of the positioning portion 132a and does not form the structural interference with the positioning portion 132a.

In the embodiment, the second pivot component 134 has an elastic portion 134c. The elastic portion 134c includes two elastic arms 134d as shown in FIG. 7. A free end of each elastic arm 134d has a guiding arc surface 134e. The sliding component 136 has a second column 136c. The second column 136c leans against the two guiding arc surfaces 134e as shown in FIGS. 7-9 so that the sliding component 136 is positioned at the first position P1. When the first pivot component 132 shown in FIG. 8 rotates relative to the second pivot component 134 in the second pivot direction D2 and pushes the sliding component 136 via the positioning portion 132a, the second column 136c of the sliding component 136, as shown in FIG. 10, resists an elastic force of the two elastic arms 134d of the elastic portion 134c and moves towards a gap between the two elastic arms 134d along the two guiding arc surfaces 134e. In the meantime, the two elastic arms 134d are elastically deformed, and the sliding component 136 moves from the first position P1 shown in FIG. 8 to the second position P2 shown in FIG. 10 and drives the positioning structure 136b to move away from the moving path of the positioning portion 132a. When the positioning portion 132a moves to the second segment S2 of the moving path and deviates from the sliding component 136, the sliding component 136 will return to the first position P1 from the second position P2 via the elastic force of the elastic portion 134c. In the embodiment, the elastic portion 134c is formed by the two elastic arms 134d; however, the invention is not limited thereto. In other embodiments, the elastic portion 134c may be other elastic structures in other suitable forms as well as adaptable to position the sliding component 136 in a manner stated above, and impart the elastic force to allow the sliding component 136 to return.

In summary, the sliding component in the hinge module of the invention has the positioning structure, and the first pivot component has the positioning portion. When the user opens the first body from the second body, the first pivot component fixed on the first body will rotate relative to the second pivot component fixed on the second body and drives the positioning portion to arrive at the positioning structure. Meanwhile, the structural interference formed between the positioning portion and the positioning structure positions the first pivot component and the first body. Thus, when the user presses the first body to perform touch input, the first body will shake less severely so that the user can smoothly and comfortably manipulate the electronic device. In addition, when the user closes the first body opened from the second body to the second body, the first pivot component will rotate reversely relative to the second pivot component. Then, the positioning portion pushes the sliding component to slide relative to the second pivot component, such that the positioning structure on the sliding component moves away from the moving path of the positioning portion. Thus, during the process in which the user closes the first body to the second body, the structural interference is not formed between the positioning portion and the positioning structure so that the user can smoothly and easily close the first body to the second body. Additionally, the second pivot component has the elastic portion corresponding to the sliding component, allowing the sliding component which is pushed away from the moving path of the positioning portion to return via the elastic force of the elastic portion so that the hinge module can actuate smoothly.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An electronic device, comprising:
    a first body;
    a second body; and
    a hinge module, comprising:
        a first pivot component, fixed on the first body and having a positioning portion;
        a second pivot component, fixed on the second body, wherein the first pivot component is pivoted to the second pivot component, and adaptable to rotate relative to the second pivot component to drive the positioning portion to move along a moving path; and
        a sliding component, slidably disposed at the second pivot component and having a positioning structure, wherein when the sliding component is at a first position, the positioning structure is on the moving path,
    when the first pivot component rotates relative to the second pivot component in a first pivot direction and drives the positioning portion to arrive at the positioning structure along the moving path, the second pivot component stops the sliding component from sliding and a structural interference is formed between the positioning portion and the positioning structure to position the first pivot component and the first body,
    when the first pivot component rotates relative to the second pivot component in a second pivot direction opposite to the first pivot direction, the sliding component is pushed by the positioning portion and slides relative to the second pivot component from the first position to a second position, so as to drive the positioning structure to move away from the moving path.

2. The electronic device according to claim 1, wherein when the first pivot component rotates relative to the second pivot component in the first pivot direction, an included angle between the first body and the second body gradually increases, when the first pivot component rotates relative to the second pivot component in the second pivot direction, the included angle between the first body and the second body gradually decreases.

3. The electronic device according to claim 1, wherein the moving path comprises a first segment and a second segment, the positioning structure is aligned to the first segment, when an included angle between the first body and the second body is smaller than an angle, the positioning portion is at the second segment, and when the included angle between the first body and the second body is larger than the angle, the positioning portion is at the first segment.

4. The electronic device according to claim 1, wherein the second pivot component has a first sliding slot, the positioning portion is slidably disposed in the first sliding slot, and the first sliding slot constitutes the moving path.

5. The electronic device according to claim 1, wherein the positioning structure comprises a plurality of recessed portions, when the sliding component is at the first position, the recessed portions are arranged in order along the moving path, and the positioning portion is adaptable to be positioned at any one of the recessed portions.

6. The electronic device according to claim 1, wherein the sliding component has at least a second sliding slot, the second pivot component has at least a first column, and the first column is slidably disposed in the second sliding slot.

7. The electronic device according to claim 6, wherein when the sliding component is at the first position, the first column leans against an end of the second sliding slot, when the first pivot component rotates relative to the second pivot component in the first pivot direction and drives the positioning portion to arrive at the positioning structure, a structural interference formed between the end of the second sliding slot and the first column stops the sliding component from sliding relative to the second pivot component.

8. The electronic device according to claim 7, wherein when the first pivot component rotates relative to the second pivot component in the second pivot direction, the sliding component is pushed by the positioning portion, and the first column moves towards an another end of the second sliding slot from the end of the second sliding slot.

9. The electronic device according to claim 1, wherein the second pivot component has an elastic portion, the sliding component leans against the elastic portion to be positioned at the first position, when the first pivot component rotates relative to the second pivot component in the second pivot direction and pushes the sliding component via the positioning portion, the sliding component resists an elastic force of the elastic portion to move from the first position to the second position, when the positioning portion deviates from the sliding component, the sliding component returns from the second position to the first position via the elastic force of the elastic portion.

10. The electronic device according to claim 9, wherein the elastic portion comprises two elastic arms, a free end of each of the elastic arms has a guiding arc surface, the sliding component has a second column, the second column leans against the two guiding arc surfaces so that the sliding component is positioned at the first position, when the sliding component moves to the second position, the second column resists the elastic force of the two elastic anus and moves towards a gap between the two elastic arms along the two guiding arc surfaces.

11. A hinge module, adaptable for an electronic device which comprises a first body and a second body, comprising:
a first pivot component, fixed on the first body and having a positioning portion;
a second pivot component, fixed on the second body, wherein the first pivot component is pivoted to the second pivot component, and adaptable to rotate relative to the second pivot component to drive the positioning portion to move along a moving path; and
a sliding component, slidably disposed at the second pivot component and having a positioning structure, wherein when the sliding component is at a first position, the positioning structure is on the moving path,
when the first pivot component rotates relative to the second pivot component in a first pivot direction and drives the positioning portion to arrive at the positioning structure along the moving path, the second pivot component stops the sliding component from sliding and a structural interference is formed between the positioning portion and the positioning structure to position the first pivot component and the first body,
when the first pivot component rotates relative to the second pivot component in a second pivot direction opposite to the first pivot direction, the sliding component is pushed by the positioning portion to slide relative to the second pivot component from the first position to a second position so as to drive the positioning structure to move away from the moving path.

12. The hinge module according to claim 11, wherein when the first pivot component rotates relative to the second pivot component in the first pivot direction, an included angle between the first body and the second body gradually increases, when the first pivot component rotates relative to the second pivot component in the second pivot direction, the included angle between the first body and the second body gradually decreases.

13. The hinge module according to claim 11, wherein the moving path comprises a first segment and a second segment, the positioning structure is aligned to the first segment, when an included angle between the first body and the second body is smaller than an angle, the positioning portion is at the second segment, and when the included angle between the first body and second body is larger than the angle, the positioning portion is at the first segment.

14. The hinge module according to claim 11, wherein the second pivot component has a first sliding slot, the positioning portion is slidably disposed in the first sliding slot, and the first sliding slot constitutes the moving path.

15. The hinge module according to claim 11, wherein the positioning structure comprises a plurality of recessed portions, when the sliding component is at the first position, the recessed portions are arranged in order along the moving path, and the positioning portion is adaptable to be positioned at any one of the recessed portions.

16. The hinge module according to claim 11, wherein the sliding component has at least a second sliding slot, the second pivot component has at least a first column, and the first column is slidably disposed in the second sliding slot.

17. The hinge module according to claim 16, wherein when the sliding component is at the first position, the first column leans against an end of the second sliding slot, when the first pivot component rotates relative to the second pivot component in the first pivot direction and drives the positioning portion to arrive at the positioning structure, a structural interference formed between the end of the second sliding slot and the first column stops the sliding component from sliding relative to the second pivot component.

18. The hinge module according to claim 17, wherein when the first pivot component rotates relative to the second pivot component in the second pivot direction, the sliding component is pushed by the positioning portion and the first column moves towards an another end of the second sliding slot from the end of the second sliding slot.

19. The hinge module according to claim 11, wherein the second pivot component has an elastic portion, the sliding component leans against the elastic portion to be positioned at the first position, when the first pivot component rotates relative to the second pivot component in the second pivot direction and pushes the sliding component via the positioning portion, the sliding component resists an elastic force of the elastic portion to move from the first position to the second position, when the positioning portion deviates from the sliding component, the sliding component returns from the second position to the first position via the elastic force of the elastic portion.

20. The hinge module according to claim 19, wherein the elastic portion comprises two elastic awls, a free end of each of the elastic arms has a guiding arc surface, the sliding component has a second column, the second column leans against the two guiding arc surfaces so that the sliding component is positioned at the first position, when the sliding component moves to the second position, the second column resists an elastic force of the two elastic arms and moves towards a gap between the two elastic arms along the two guiding arc surfaces.

* * * * *